(12) United States Patent
Nikol et al.

(10) Patent No.: US 9,073,476 B2
(45) Date of Patent: Jul. 7, 2015

(54) MULTIFUNCTIONAL STRIP FOR MOTOR VEHICLE

(75) Inventors: Benjamin Nikol, Ingolstadt (DE);
Markus Halm, Baldham (DE);
Sebastian Schwartze, Ingolstadt (DE);
Christian Winkelmann, München (DE);
Robert Angermüller, Ingolstadt (DE);
Christian Brendel, Eichstätt (DE);
Christoph Schmitz, Abensberg (DE);
Jens Dietmar Reuschel, Ingolstadt (DE); Tobias Urban, Besigheim-Ottmarsheim (DE)

(73) Assignee: AUDI AG, Ingolstadt (DE)

( * ) Notice: Subject to any disclaimer, the term of this patent is extended or adjusted under 35 U.S.C. 154(b) by 28 days.

(21) Appl. No.: 13/591,702

(22) Filed: Aug. 22, 2012

(65) Prior Publication Data
US 2013/0214915 A1    Aug. 22, 2013

(30) Foreign Application Priority Data
Aug. 23, 2011   (DE) .......................... 10 2011 111 422

(51) Int. Cl.
| | |
|---|---|
| *B60Q 1/00* | (2006.01) |
| *B60R 25/10* | (2013.01) |
| *B60Q 9/00* | (2006.01) |
| *B60Q 5/00* | (2006.01) |
| *B60R 13/04* | (2006.01) |
| *G09F 21/04* | (2006.01) |
| *G10K 9/12* | (2006.01) |
| *B60Q 1/26* | (2006.01) |
| *B60Q 1/32* | (2006.01) |

(52) U.S. Cl.
CPC .............. *B60Q 9/00* (2013.01); *B60Q 1/0023* (2013.01); *B60Q 1/0035* (2013.01); *B60Q 5/008* (2013.01); *B60R 13/04* (2013.01); *G09F 21/04* (2013.01); *B60Q 2400/40* (2013.01); *G10K 9/12* (2013.01); *B60Q 1/263* (2013.01); *B60Q 1/32* (2013.01)

(58) Field of Classification Search
CPC .. B60Q 1/0023; B60Q 1/0035; B60Q 1/2619; B60Q 1/2669; B60Q 1/323; B60Q 2400/40; B60R 13/04; B60R 2011/0026; B60R 2011/0089; B60R 19/445
USPC .............................. 340/425.5, 426.23, 426.25
See application file for complete search history.

(56) References Cited

U.S. PATENT DOCUMENTS

| | | | | |
|---|---|---|---|---|
| 5,627,509 | A * | 5/1997 | Gajewski et al. | ........ 340/426.27 |
| 6,768,413 | B1 * | 7/2004 | Kemmann et al. | ........... 340/5.72 |
| 7,248,151 | B2 * | 7/2007 | McCall | ..................... 340/426.35 |

(Continued)

FOREIGN PATENT DOCUMENTS

| | | |
|---|---|---|
| DE | 100 60 780 A1 | 6/2002 |
| DE | 10 2005 044 053 A1 | 3/2007 |

(Continued)

*Primary Examiner* — Jennifer Mehmood
*Assistant Examiner* — Emily C Terrell
(74) *Attorney, Agent, or Firm* — Henry M. Feiereisen LLC

(57) ABSTRACT

A multifunctional strip for a motor vehicle includes a panel element having a strip-shaped configuration and constructed for outputting first and second items of information which differ from one another; and at least one actuator for outputting an acoustic signal as one of the items of information. The multifunctional strip can be arranged on the outside of the body of the motor vehicle.

11 Claims, 2 Drawing Sheets

(56) References Cited

U.S. PATENT DOCUMENTS

| | | | |
|---|---|---|---|
| 7,260,454 B2 * | 8/2007 | Pickering et al. | 701/2 |
| 2002/0063008 A1 * | 5/2002 | Spies | 180/274 |
| 2006/0238385 A1 * | 10/2006 | Steenwyk et al. | 341/33 |
| 2007/0030136 A1 | 2/2007 | Teshima et al. | |
| 2007/0236450 A1 * | 10/2007 | Colgate et al. | 345/156 |
| 2010/0238006 A1 | 9/2010 | Grider et al. | |
| 2011/0199199 A1 | 8/2011 | Perkins | |

FOREIGN PATENT DOCUMENTS

| | | |
|---|---|---|
| DE | 10 2009 005 558 A1 | 3/2007 |
| DE | 10 2009 040 898 | 3/2011 |
| DE | 10 2009 057 825 A1 | 6/2011 |
| DE | 10 2009 057 981 | 6/2011 |
| DE | 10 2010 013 700 A1 | 8/2011 |
| EP | 1 762 428 | 3/2007 |
| EP | 1 927 512 A2 | 6/2008 |
| FR | 2 860 823 A1 | 4/2005 |
| GB | 2 468 560 A | 9/2010 |
| TW | 255243 | 5/2006 |
| WO | WO2009/155654 A1 | 12/2009 |

* cited by examiner

MULTIFUNCTIONAL STRIP FOR MOTOR VEHICLE

CROSS-REFERENCES TO RELATED APPLICATIONS

This application claims the priority of German Patent Application, Serial No. 10 2011 111 422.3, filed Aug. 23, 2011, pursuant to 35 U.S.C. 119(a)-(d), the disclosure of which is incorporated herein by reference.

BACKGROUND OF THE INVENTION

The present invention relates to a multifunctional strip for a motor vehicle.

The following discussion of related art is provided to assist the reader in understanding the advantages of the invention, and is not to be construed as an admission that this related art is prior art to this invention.

Modern motor vehicles include multiple display and input elements. Corresponding display elements can inform the driver or the other vehicle occupants about the technical condition of the motor vehicle or respectively its systems. For this purpose motor vehicles usually include a board computer or respectively a combination instrument. Additionally so called Head Up Displays are known with which items of information can be projected onto the inside of the windshield. Likewise the other road users can be informed with corresponding display elements for example the direction indicators.

In addition, multiple control elements in form of corresponding buttons and switches are present which are for example arranged on the dashboard or the center console. Board computers in modern vehicles can now also be operated via a touch screen.

It would be desirable and advantageous to provide a multifunctional strip for a motor vehicle to obviate prior art shortcomings and to operate the motor vehicle more efficiently and safer.

SUMMARY OF THE INVENTION

According to one aspect of the present invention, a multifunctional strip for a motor vehicle includes a panel element having a strip-shaped configuration and constructed for outputting first and second items of information which differ from one another; and at least one actuator for outputting an acoustic signal as one of the items of information.

According to another advantageous feature of the present invention, the multifunctional strip can be arranged at an outside of the body of the motor vehicle. Thus, the driver can access corresponding items of information from the motor vehicle or operational components already before entering the motor vehicle. With the multifunctional strip at least two items of information which are independent of one another can be provided for the driver and/or other road users. The items of information can for example indicate a condition of the motor vehicle or systems of the motor vehicle. Also, the items of information can contain data relating to the environment of the motor vehicle.

According to another advantageous feature of the invention, the actuator can be configured in the form of an electromagnetic actuator a piezoelectric actuator, an electrostatic actuator, or the like. A corresponding recess in the vehicle body of the motor vehicle can be utilized as resonance body. In addition items of information can be provided to the driver or other road users by an acoustic signal. For example, respective warning signals may be triggered, or the acoustic signal may be use to alert other road users to the motor vehicle. For example, an engine sound in case of an electric car can be generated. In this way traffic safety can be increased.

According to another advantageous feature of the invention, the multifunctional strip may be attached in a recess of the outside of the body of the motor vehicle. The multifunctional strip can have an essentially strip-shaped configuration. The multifunctional strip can, for example, extend laterally on the outside of the motor vehicle from the headlights to the rear lights. Also, the multifunctional strip can extend over only a partial lateral region of the motor vehicle or the multifunctional strip can include multiple separate regions.

According to another advantageous feature of the invention, the multifunctional strip can include at least one control element for inputting data. Such a control element can be configured in the form of a corresponding switch. The control element can also be configured as touch-sensitive surface or as touchpad. The control element can, for example, include corresponding sensors which can detect a touch, a pressure, or a temperature change. Thus, a control element can be provided which is durable against environmental influences. The provision of a control element in the multifunctional strip enables execution of corresponding control actions or activation or deactivation of functions of the motor vehicle before entering the motor vehicle or before starting the motor vehicle. Also, the vehicle can still be operated easily after exiting or parking the motor vehicle.

According to another advantageous feature of the invention, at least one optical display element can be provided for outputting at least one of the first and second items of information. The optical display element provides the driver information about the operating condition of respective components of the motor vehicle. The driver can, for example, be informed about a state of charge of an energy storage device of the motor vehicle or the fill level of the fuel tank. In particular, in the case of an electric or hybrid vehicle, the driver—for example when recharging—quickly receives information with respect to the state of charge. In addition, cues can be provided with the display element to the driver or other road users. For example, the display element can include corresponding illuminants. In addition, the multifunctional strip can have light-permeable and light-impermeable regions behind which one or multiple illuminants are arranged. The optical display element can, for example, be configured as monitor or display. The display element enables illustration of letters, symbols, colored representations, warnings or the like. The optical display element on the outside of the motor vehicle and the information displayed on the latter can be recognized particularly easily by the other road users and thus the traffic safety increased.

According to another advantageous feature of the invention, the display element can include at least one illuminant and be constructed to function as an illumination unit and/or a direction indicator of the motor vehicle. Examples of illuminants include light-emitting diodes, organic light-emitting diodes, optical fibers, or the like. As a result, the function of a lateral light of a turn signal can be provided. The turn signal has a greater surface compared to known turn signal lights and can therefore be better recognized by other road users. This is in particular true for the function of hazard lights. Likewise, the multifunctional strip can be used as illumination element of the motor vehicle. The multifunctional strip which is advantageously disposed laterally on the motor vehicle can be clearly recognized and thus for example collisions, when changing lanes, can be avoided. In addition the multifunctional strip can contribute to a better recognition of a motor vehicle by other road users in case of poor visibility.

As a result, safety of vehicle occupants and other road users is enhanced. The multifunctional strip also enables an extended coming-home function which serves as illumination for the driver after parking the motor vehicle.

According to another advantageous feature of the invention, the multifunctional strip can include a touch screen. A multifunctional strip which has the functionally of a touch screen can be used as control element and as display element. In addition, a simple and intuitive control of the multifunctional strip can thus be enabled. This touch screen can be configured such as to be resistant to environmental influences or damage.

According to another aspect of the present invention, a motor vehicle includes a multifunctional strip having a panel element of strip-shaped configuration and constructed for outputting first and second items of information which differ from one another; and at least one actuator for outputting an acoustic signal as one of the items of information.

According to another advantageous feature of the invention, the motor vehicle can include a sensor device for detecting at least one operating condition of an operational component of the motor vehicle and/or an environmental sensor for detecting environmental data of the motor vehicle, wherein with the multifunctional strip the at least one operating condition and/or the environmental data of the motor vehicle can be displayed. Thus, the driver can be informed of a malfunction of the operational component of the motor vehicle. Likewise, the driver can be informed of a critical fill level of the fuel tank or of a critical state of charge of an electric energy storage device. In addition, the data of environmental sensors or the motor vehicle can be indicated or displayed. For example, information about traffic situation, road conditions and/or weather conditions may be displayed. A multifunctional strip according to the present invention should be configured to display at least all items of information which are currently outputted by a board computer or information system of the motor vehicle.

A multifunctional strip according to the present invention may also be used for data transmission between different motor vehicles. For this purpose, the multifunctional strip can include a transceiver device. In addition, a multifunctional strip according to the present invention can be used to communicate with other systems or components in the vicinity of the motor vehicle. For example, the multifunctional strip may be coupled with systems in the home of the driver. The driver can thus be informed by the multifunctional strip, for example, that the light or the stove has not been switched off. As a result, a multifunctional strip according to the present invention significantly enhances comfort and safety.

According to another advantageous feature of the present invention, the multifunctional strip can be configured for effecting an opening and/or closing of a door, a tank cap and/or a hatchback. In addition, the multifunctional strip can be coupled with a key of the motor vehicle whereby the motor vehicle can be unlocked and locked. In addition, opening and/or closing of windows, a sunroof, or a convertible top is rendered possible. Thus, the motor vehicle can be operated in a particularly simple and comfortable manner.

BRIEF DESCRIPTION OF THE DRAWING

Other features and advantages of the present invention will be more readily apparent upon reading the following description of currently preferred exemplified embodiments of the invention with reference to the accompanying drawing, in which.

DETAILED DESCRIPTION OF PREFERRED EMBODIMENTS

Figure 1:
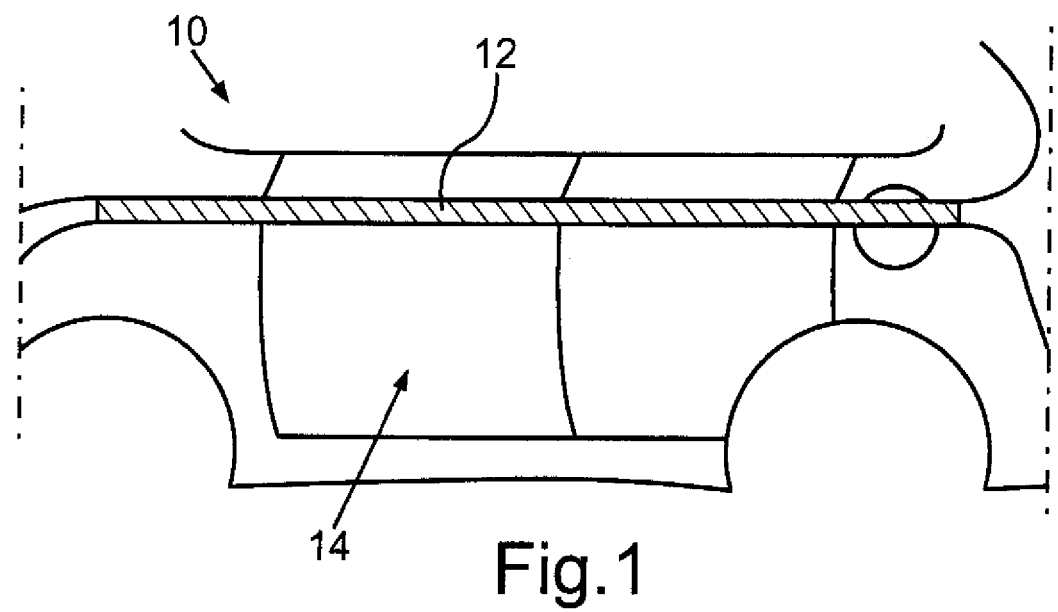
FIG. 1 shows a schematic representation of a motor vehicle with a multifunctional strip.

Throughout all the Figures, same or corresponding elements are generally indicated by same reference numerals. These depicted embodiments are to be understood as illustrative of the invention and not as limiting in any way. It should also be understood that the drawings are not necessarily to scale and that the embodiments are sometimes illustrated by graphic symbols, phantom lines, diagrammatic representations and fragmentary views. In certain instances, details which are not necessary for an understanding of the present invention or which render other details difficult to perceive may have been omitted.

Turning now to the drawing, and in particular to FIG. 1, there is shown a schematic side view of a motor vehicle 10 on which a multifunctional strip 12 is arranged. The multifunctional strip 12 can be attached to the outside of the vehicle body 14 of the motor vehicle 10 as vehicle body panel. The multifunctional strip 12 is essentially configured strip shaped. In the exemplary embodiments shown in FIG. 1 the multifunctional strip 12 extends over the outer lateral region of the vehicle body 14 of the motor vehicle 10 from the head lights to the rear lights of the motor vehicle 10. The multifunctional strip 12 can also extend only over some regions of the lateral region of the motor vehicle 10. Further, the multifunctional strip 12 can have a shape which deviates from the shape shown in FIG. 1.

The multifunctional strip 12 is configured to output at least two items of information which are independent of one another. Such items of information can for example indicate a condition of the motor vehicle 10 or respectively the systems of the motor vehicle 10. The items of information can also contain data relating to the vicinity of the motor vehicle 10. In order to output the corresponding data, the multifunctional strip 12 can include a corresponding optical display element (not shown here). The display element can preferably include corresponding illuminants. The display element can also be configured as a monitor or respectively display. With the display element letters, symbols, warnings, colorful representations or the like can be displayed.

In addition, the multifunctional strip 12 can include corresponding illuminants with which the functionality of an illumination unit of the motor vehicle 10 can be provided. Preferably, light emitting diodes, organic light emitting diodes, optical fibers or the like can be used as illuminants. In this way a corresponding illumination of the motor vehicle 10 at the lateral region of the vehicle body 14 can be enabled with the multifunctional strip 12. Likewise, the multifunctional strip 12 can also function as the lateral light of a turn signal or blinker. Likewise, a coming-home-function can be provided by means of the multifunctional strip 12 which illuminates the way home for the driver after parking the motor vehicle.

In addition, the multifunctional strip 12 preferably includes an additional control element for inputting data. This here not shown control element can for example be configured in the form of a corresponding switch. However, the control element can advantageously be configured as touch sensitive surface or respectively, touchpad. For this purpose the control element can include corresponding sensors with which a touch, a pressure or a temperature change can be detected. Likewise, the multifunctional strip 12 can include at least one touch screen which can also be used as display element.

In a further embodiment, the multifunctional strip 12 can include a corresponding actuator to output an acoustic signal. As a result, warning signals can be generated to alert the driver and other road users. The actuator can be configured as loudspeaker, piezoelectric actuator or the like. With this actuator an acoustic signal can also be generated which emulates a sound of an engine. Thus, in particular electric vehicles can be better recognized by the other road users and in particular persons with impaired vision.

The motor vehicle 10 usually includes one or more sensor devices with which the condition of the individual operational components of the motor vehicle 10 can be detected. Sensors which are already present in the motor vehicle can be used. With these sensor devices for example the state of charge of an electric energy storage device of the motor vehicle 10 can be determined. Likewise, the operating condition or respectively the functionality of the individual operational components of the motor vehicle 10 can be determined with the one or more sensor elements. Further, the motor vehicle 10 can include environmental sensors with which corresponding environmental parameters of the motor vehicle 10 can be determined. Such environmental sensors can for example be optical sensors, a navigation system or the like. Furthermore, the motor vehicle 10 can include a corresponding transceiver device, with which data or respectively items of information of other motor vehicles or systems in the vicinity of the motor vehicle can be transmitted to the motor vehicle 10. Thus, the multifunctional strip 12 can be connected with other motor vehicles or for example with the home of the driver via a corresponding data connection.

Figure 2:
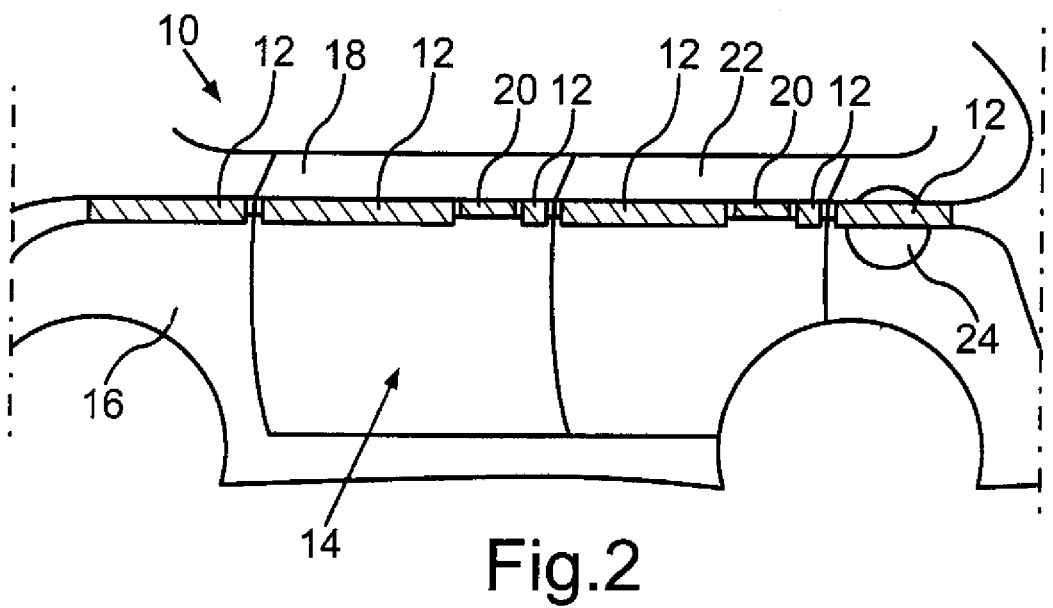
FIG. 2 shows a schematic side view of a motor vehicle with a multifunctional strip in a further embodiment.

FIG. 2 shows a schematic representation of a motor vehicle 10 in a side view, wherein a multifunctional strip 12 is arranged on the motor vehicle. In the shown embodiment the multifunctional strip 12 is subdivided into multiple regions or respectively is formed by multiple individual parts. In the present case, a first part of the multifunctional strip 12 is located on the front mudguard 16 of the motor vehicle 10. Further, a further part of the multifunctional strip 12 is located on the outside of the front door 18 of the motor vehicle 10. The multifunctional strip 12 can be subdivided by a door handle 20. Likewise, it is conceivable that the multifunctional strip 12 correspondingly surrounds the door handle 20. A similar arrangement results for the rear door 22 of the motor vehicle 10. A corresponding recess for the tank cap 24 of the motor vehicle can also be provided. Here it is also conceivable that the multifunctional strip 12 extends past the tank cap 24.

Figure 3:
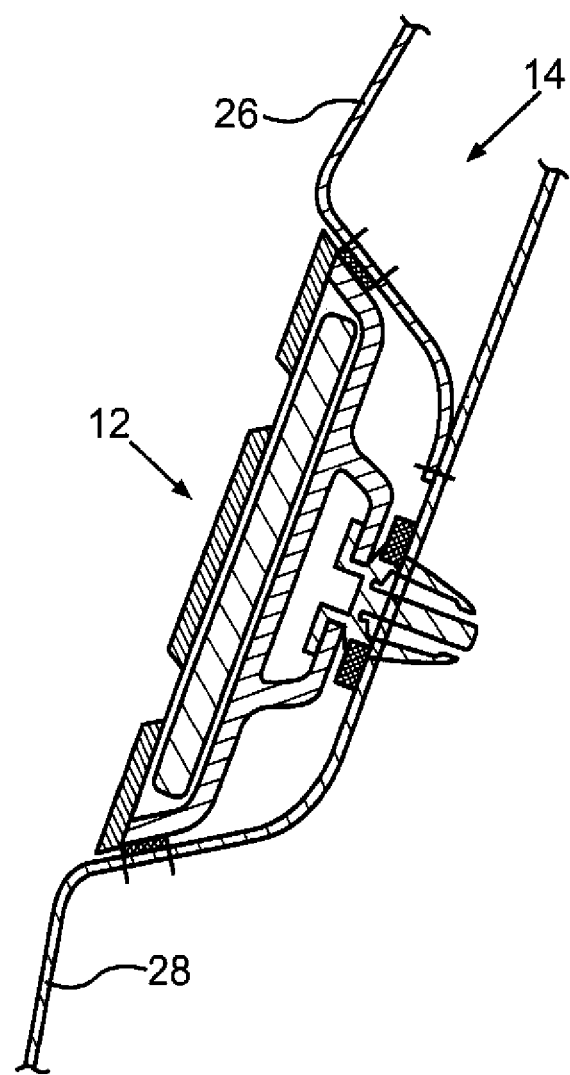
FIG. 3 shows a sectional side view of an arrangement of the multifunctional strip in a vehicle body of a motor vehicle.

FIG. 3 shows a sectional side view of an arrangement of the multifunctional strip 12 in a recess of the vehicle body 14 of the motor vehicle 10. Here, the vehicle body 14 is formed by a first vehicle body panel 26 and a second vehicle body panel 28. The multifunctional strip 12 is supplied with electric energy by the onboard power supply of the motor vehicle 10. For this the multifunctional strip 12 includes usually a here not shown plug element. Further the multifunctional strip 12 is connected with sensors of the motor vehicle 10. For this a corresponding data interface or respectively a connection to a data bus of the motor vehicle 10 can be provided. The multifunctional strip 12 also connected with corresponding actuators in the motor vehicle 10. This allows opening or closing the doors, the trunk and/or the tank cap of the motor vehicle 10 by actuating a control element of the multifunctional strip 12.

The multifunctional strip 12 is connected with the vehicle body 14 of the motor vehicle 10 via corresponding connection elements. For this a corresponding latching connection can for example be provided. Likewise corresponding screw and/or bonding connection are conceivable. In addition a corresponding here not shown sealing element can be provided which is arranged between the multifunctional strip 12 and the vehicle body 14.

While the invention has been illustrated and described in connection with currently preferred embodiments shown and described in detail, it is not intended to be limited to the details shown since various modifications and structural changes may be made without departing in any way from the spirit of the present invention. The embodiments were chosen and described in order to best explain the principles of the invention and practical application to thereby enable a person skilled in the art to best utilize the invention and various embodiments with various modifications as are suited to the particular use contemplated.

What is claimed as new and desired to be protected by Letters Patent is set forth in the appended claims and includes equivalents of the elements recited therein:

1. A multifunctional strip for a motor vehicle, comprising:
   a panel element having a strip-shaped configuration and constructed for outputting first and second items of information which are independent of one another;
   at least one actuator provided on the panel element for outputting an audible acoustic signal as one of the items of information, said at least one actuator constructed controllable to output the audible acoustic signal; and
   at least one optical display element for outputting at least one of the first and second items of information.

2. The multifunctional strip of claim 1, arranged on an outside of a body of the motor vehicle.

3. The multifunctional strip of claim 1, attached in a recess of an outside of a body of the motor vehicle.

4. The multifunctional strip of claim 1, wherein the actuator is configured in the form of an electromagnetic actuator a piezoelectric actuator, or an electrostatic actuator.

5. The multifunctional strip of claim 1, further comprising at least one control element for inputting data.

6. The multifunctional strip of claim 1, wherein the display element includes at least one illuminant and is constructed to function as at least one member selected from the group consisting of an illumination unit of the motor vehicle and a direction indicator of the motor vehicle.

7. The multifunctional strip of claim 6, wherein the illuminant is configured in the form of a light-emitting diode, organic light-emitting diode, or optical fibers.

8. The multifunctional strip of claim 1, further comprising a touch screen.

9. A motor vehicle, comprising a multifunctional strip including a panel element having a strip-shaped configuration and constructed for outputting first and second items of information which are independent of one another;
   at least one actuator provided on the panel element for outputting an audible acoustic signal as one of the items of information, said at least one actuator constructed controllable to output the audible acoustic signal; and
   at least one optical display element for outputting at least one of the first and second items of information.

10. The motor vehicle of claim 8, further comprising at least one member selected from the group consisting of a sensor device for detecting at least one operating condition of an operational component of the motor vehicle, and an environmental sensor for detecting environmental data of the motor vehicle, wherein the multifunctional strip is configured to display the at least one operating condition and/or the environmental data of the motor vehicle.

11. The motor vehicle of claim 8, wherein the multifunctional strip is configured for effecting an opening and/or closing of a door, a tank cap and/or a hatchback of the motor vehicle.

* * * * *